April 25, 1967    R. R. BALAGUER    3,315,912
MOUNTING FOR A FISHING REEL
Original Filed July 1, 1963
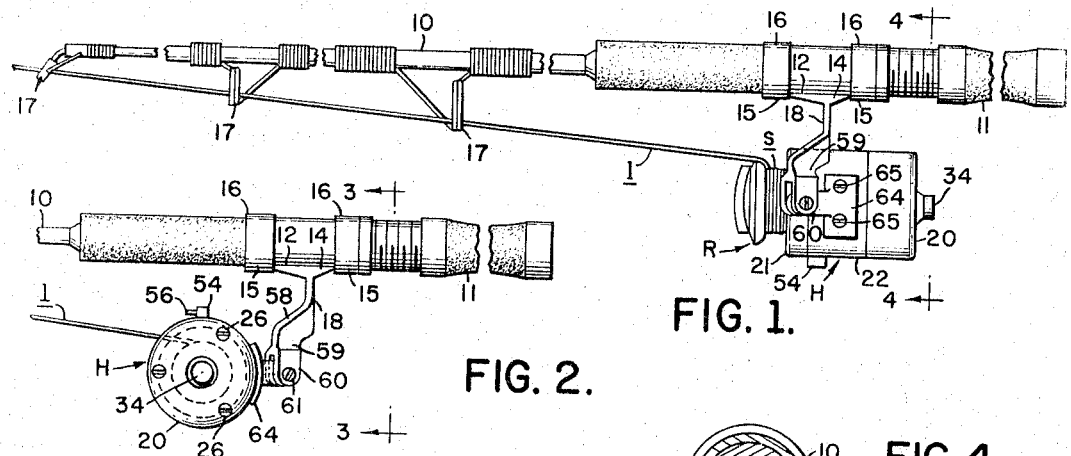
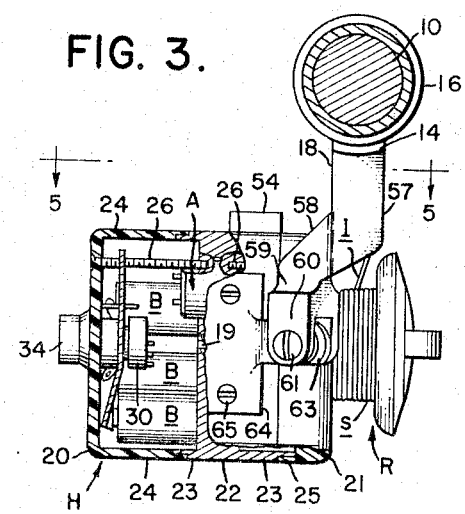
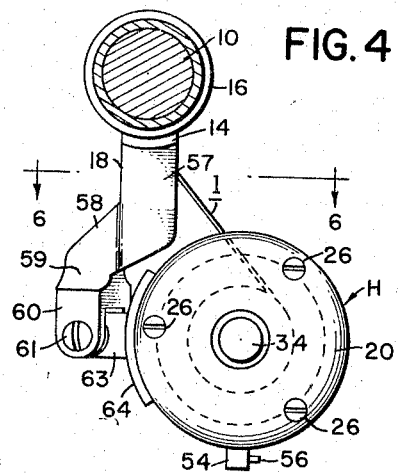
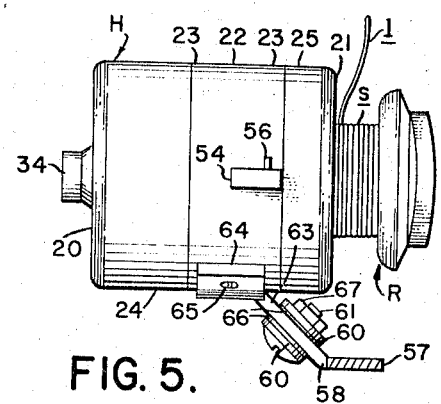
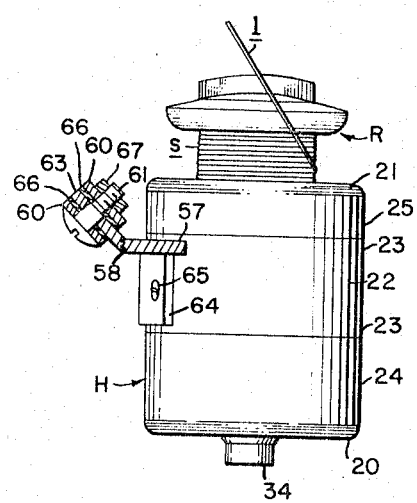
INVENTOR
RODOLFO R. BALAGUER
BY *Ephraim Cumming III*
ATTORNEY

United States Patent Office 3,315,912
Patented Apr. 25, 1967

3,315,912
MOUNTING FOR A FISHING REEL
Rodolfo R. Balaguer, Fort Lauderdale, Fla., assignor, by mesne assignments, to Patent Holding Corporation, Fort Lauderdale, Fla., a corporation of Florida
Original application July 1, 1963, Ser. No. 292,015, now Patent No. 3,195,829, dated July 20, 1965. Divided and this application Oct. 12, 1964, Ser. No. 403,128
6 Claims. (Cl. 242—84.2)

This application is a division of my application Ser. No. 292,015, filed July 1, 1963 and now Patent No. 3,195,829.

This invention relates to a mounting for a line-winding fishing reel. More particularly it is concerned with such a mounting, applicable to a conventional fishing rod, whereby the reel may be swiveled between two positions in one of which its axis is parallel with that of the rod to facilitate line-casting operations while its rotatable spool remains stationary, and in its other position the axis of the reel spool is disposed transversely of the rod in an optimum line-winding position.

The present invention is further concerned with a swiveled mounting for a spinning type of reel which may be operated by a motor energized from a source of electrical energy constituting a power unit which is self-contained within a housing therefor. Such a housing may also be combined with the supporting frame for the reel to provide a mounting for the power unit. When swively mounted upon a conventional fishing rod, as by the means herein disclosed, the housing is movable between optimum casting and winding positions in both of which it remains spaced an equal distance from the rod, preferably upon its under or far side as viewed by the user. As a result, when a casting operation is to be performed, the reel is free to release the line from its spool with a minimum of resistance; also when re-winding is to take place, the line windings are distributed more evenly and smoothly lengthwise of the reel spool. The inclusion within the reel frame housing of a self-contained power unit, along with driving connections to the reel spool which is carrier exteriorly of the housing, poses a special problem arising from its increased size necessary (1) for accommodation and protection of all operating parts, and (2) for maintenance between the rod and reel of an adequate space for reception of the fingers of the hand which is engaged in holding and manipulating the rod. These difficulties have been adequately met by the present improved mounting for the housing which provides for shifting of the unitary power unit-reel assembly between its two operating positions wherein only a minimum of resistance is offered to lineal movement of the line to and from the reel spool.

In addition to these special objectives, certain other objects and advantages are attained as will appear hereinafter from the detailed description of the preferred embodiment of this invention as illustrated in the accompanying drawing in the manner following:

FIGURE 1, which is an elevational view of a fishing rod in a horizontal position, shows on its under side a reel supported by the present swiveled mounting in a line-casting position;

FIG. 2, which is a similar view confined to the handle end portion of the rod, shows the reel disposed in a line-winding position;

FIG. 3 is a cross section through the rod, taken on line 3—3 of FIG. 2, the reel being in a line-winding position and the frame-housing therefor being broken away to exhibit therewithin a power unit for operation thereof;

FIG. 4 is a transverse sectional view through the rod, taken on line 4—4 of FIG. 1, showing in elevation the reel spool in its line-casting position;

FIG. 5 is a transverse sectional view taken on line 5—5 of FIG. 3, showing in elevation the reel spool in its line-winding position; and FIG. 6 is a transverse sectional view taken on line 6—6 of FIG. 4, showing in elevation the reel spool in its line-casting position.

The fishing rod 10 herein illustrated is conventional in that its shaft is enlarged in one end portion where a handle grip 11 is provided, also a seat 12 along one side of the rod for reception of an elongated base plate 14 whose opposite end portions are clampingly received within open-ended recesses 15 each formed radially in a collar 16 which surrounds the seat, one or both of these collars being slidable toward and from the other. The interengaging faces of the base plate and collar recesses are inclined so as to produce therebetween a frictional interlock which increases as one collar is advanced toward the other. One or more aligned guides 17 of circular contour are shown as fixedly carried upon the rod, in spaced relation lengthwise thereof, these guides being aligned also with the reel seat 12 and being graduated in size with the smallest guide disposed at the tip end of the rod.

Fixedly extended from the base plate 14, at a point intermediately of its ends, is a rigid arm 18 which is comprised in the swiveled bracket mounting of this invention. As illustrated, the reel R carried by this mounting is positioned at one end of a housing H, exteriorly thereof, which is generally cylindrical in form to accommodate within itself a self-contained power unit comprising a motor A and a system of batteries B (FIG. 3). A shaft 19 whereon is mounted the reel spool s is extended through one end of the housing into its interior for operative connection through suitable gearing (not shown) with the drive shaft of the motor, all as disclosed in detail in my copending application filed July 1, 1963 under Ser. No. 292,015, now Patent No. 3,195,829, and entitled Power Unit-Reel Assembly for Fishing Rods, of which case this application is a division.

The housing H desirably comprises at one end a cap plate 20 of plastic or the like, a bearing plate 21 at the opposite end, also of like material, and therebetween a circular body or frame 22 of aluminum or the like (FIG. 3) formed with oppositely disposed circular flanges 23 in interfitting engagement with like flanges 24 and 25 extending, respectively, from the cap and bearing plates 20 and 21. Cells formed through the frame 22 provide individual seats wherein the motor A and batteries B are fixedly mounted, with their axes parallel with that of the reel and arranged coradially thereof in symmetrical relation within the housing. Suitable means, such as screw bolts 26 extending through the cap and bearing plates for anchorage in tapped holes in the frame 22, may be provided for fixedly, yet releasably, securing the frame body 22 and two end plates together in unitary relation whereby to provide a supporting frame for the reel whose spool s is disposed exteriorly thereof, and for all operating parts therewithin which are fully enclosed and protected against water and other elements. A housing of this general description is adapted to enclose, besides the power unit itself, other auxiliary means such as a speed-controlling rheostat 30 operable by a knob 34 exteriorly of the housing at its end oppositely of the spool, also a conventional normally-open switch 54 interposed in the electrical circuit to the motor, to start, change speed, and stop the motor. This switch which is carried exteriorly of the housing H, preferably upon its side which is uppermost whenever the reel is in line-winding position (FIG. 3), is operable by a depressible actuating button 56 located for engagement by the fingers of the hand which is holding the rod when the latter is put to its intended use.

A line l attached at one end to the reel spool s to be wound or unwound relative thereto leads therefrom to the proximate guide 17 and thence through the remaining guides to the rod tip beyond which it continues free of restraint. Because of their graduated sizes, these guides define a slender cone having its axis coincident with the guide centers. In the normal operating position of the rod, a jointed bracket extends downwardly from the base plate 14 to provide for the housing H a swiveled mounting whereon the present motorized reel assembly is free to swing through 180 degrees between line-casting and line-winding positions. The arm 18 extending normally from the base plate constitutes one element of this jointed bracket. As best shown in FIGS. 3–6, this arm is in the general form of a strap which is bent and contoured to provide (a) a radial portion 57 rigidly joined to the base plate 14, (b) an intermediate portion 58 which is angled relative thereto both downwardly and laterally, and (c) a depending joint portion 59 having a pair of spaced cheeks 60 through which are aligned openings for reception of a pivot pin 61 (FIGS. 5 and 6) such as the shank of a screw or bolt whose axis is non-coplanar with that of the rod and not parallel therewith nor transversely thereof, but obliquely with respect thereto. Fitting between the two cheeks 60 is a tongue 63, also apertured for reception of the pivot pin 61 therethrough, this tongue being extended obliquely outwardly at an angle of approximately 45 degrees from a base plate 64 which is contoured to fit upon the exterior face of the circular frame 22 of the housing H to which the base plate may be immovably secured by appropriate means such as screws 65. The fit of the tongue between the cheeks is such that it will engage the joint portion 59 of the arm 18 at each of the two extreme positions 180 degrees apart whereby to fix correspondingly the range of tongue movements therebetween. A jointed bracket of this general description provides upon the fishing rod a swiveled mounting for the housing H whose turning movements of 180 degrees about the axis of the pivot pin 61 are accompanied by shifting of the housing axis through only 90 degrees. In one position (FIG. 4) the housing axis is parallel with that of the rod, whereas in the other (FIG. 3) it is transverse thereto. Washers 66 of fiber, plastic or the like, are desirably fitted around the pivot pin to assure for the housing a swiveling movement which is smooth and free of lost motion. Detent means (not shown) may also be provided, as is common, to releasably hold the housing in each of its two operating positions. A nut 67 applied to the pivot pin assures its retention axially in operative position.

In the position for casting (FIGS. 1 and 4), the housing-reel axis is disposed parallel with that of the fishing rod at a point therebelow and spaced therefrom sufficiently to accommodate the fingers of the hand when engaging the rod grip 11. In the winding position (FIGS. 2 and 3), the housing axis is disposed in a plane transversely of the rod, with the reel exteriorly of the housing located directly below the rod. A medial point lengthwise of the reel spool *s*, approximately tangential with its top, then becomes aligned with the axis defined by the several guides 17 to facilitate an even distribution and level winding of the line *l* upon the spool concurrently with imposition by the guides of a minimum frictional resistance upon the line. In this position also the motor switch 54 is disposed topwise of the housing, spaced from the rod, and conveniently available for operation by one of the same fingers which engages the grip 11 for manipulation of the rod.

What is claimed is:

1. For use with a fishing rod, a line-winding reel having a supporting frame, and a mounting for the reel upon the rod consisting of pivotally jointed means extending between the frame and rod transversely of the axes of the reel and rod and in fixed connection with each with the axis of its joint disposed substantially distant from the rod and coplanarly of the reel axis but obliquely thereof at approximately 45 degrees whereby the reel may be swiveled through approximately 180 degrees away from and then toward the rod between two operating positions both spaced from the rod and in one of which the reel axis is parallel therewith and transversely thereof in the other.

2. For use with a fishing rod having an elongated seat aligned therewith, a line-winding reel having a supporting frame provided with means for attachment to the rod comprising an elongated base plate contoured to fit upon the seat while extended lengthwise thereupon for anchoring thereto, an arm affixed at one end to the base plate extending away therefrom normally thereof and provided with a free end portion obliquely disposed laterally with respect to the elongated base plate at an angle of approximately 45 degrees, and a second arm fixedly joined to the reel frame for support thereof and having a free end portion obliquely disposed with respect to the reel axis at approximately 45 degrees, and pivot means interconnecting the free end portions of the two arms to provide therebetween a swiveling axis about which the reel may be shifted through approximately 180 degrees away from and then toward the rod between two operating positions in which the reel axis is parallel thereto in one position and transversely thereof in the other.

3. A reel and mounting therefor according to claim 2 wherein interengaging means is provided on the two mounting arms to limit swiveling movements thereof whereby the reel is guided to and stopped at the two operating positions aforesaid.

4. A reel and mounting therefor according to claim 2 wherein the reel frame supports a line-winding spool exteriorly of itself with its axis disposed transversely of the rod when the reel is shifted to its line-winding position, and with a medial point lengthwise of the reel spool lying in a plane substantially intersecting the rod axis.

5. A reel and mounting therefor according to claim 2 wherein the spacing of the reel from the rod is equidistant in each of the two operating positions of the reel and sufficient to accommodate therebetween the fingers of the hand when engaged in holding the rod during use thereof.

6. For use with a fishing rod, a line-winding reel having a supporting frame attachable to the rod through a swiveled mounting comprising an arm adapted to be affixed at one end immovably to the rod and extending normally therefrom and away from the rod, the arm being provided with a free end portion obliquely disposed laterally with respect to the rod at an angle of approximately 45 degrees, a second arm fixedly joined at one end to the reel frame for support thereof and having its opposite free end portion obliquely disposed with respect to the reel axis at an angle of approximately 45 degrees, and pivot means interconnecting the free end portions of the two arms to provide therebetween a swiveling axis about which the reel may be shifted through approximately 180 degrees through a path away from and then toward the rod between two operating positions in which the reel is spaced equidistantly from the rod but with the reel axis parallel thereto in one position and transversely thereof in the other.

References Cited by the Examiner

UNITED STATES PATENTS 2,559,215  7/1951  Funk _____ 242—84.2
3,155,340  11/1964  King _____ 242—84.2

FRANK J. COHEN, *Primary Examiner.*

B. S. TAYLOR, *Assistant Examiner.*